United States Patent
Bodtker et al.

(10) Patent No.: US 11,186,307 B2
(45) Date of Patent: Nov. 30, 2021

(54) RAKE LEVER ASSEMBLY

(71) Applicant: Steering Solutions IP Holding Corporation, Saginaw, MI (US)

(72) Inventors: Joen C. Bodtker, Gaines, MI (US); Randy W. Jones, North Branch, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 76 days.

(21) Appl. No.: 16/670,469

(22) Filed: Oct. 31, 2019

(65) Prior Publication Data

US 2021/0129889 A1     May 6, 2021

(51) Int. Cl.
*B62D 1/184*     (2006.01)

(52) U.S. Cl.
CPC .................................... *B62D 1/184* (2013.01)

(58) Field of Classification Search
CPC ......... B62D 1/184; B62D 1/185; B62D 1/187
See application file for complete search history.

(56) References Cited

U.S. PATENT DOCUMENTS

| | | | | |
|---|---|---|---|---|
| 7,010,996 B2* | 3/2006 | Schick | ................. | B62D 1/184 280/775 |
| 7,322,608 B2* | 1/2008 | Yamamoto | ............. | B62D 1/184 280/775 |
| 7,717,011 B2* | 5/2010 | Hirooka | ................. | B62D 1/184 74/493 |
| 8,186,242 B2* | 5/2012 | Uesaka | ................... | B62D 1/184 74/493 |
| 8,590,932 B2* | 11/2013 | Dietz | ...................... | B60R 21/09 280/775 |
| 8,601,901 B2* | 12/2013 | Ishii | ....................... | B62D 1/184 74/493 |
| 8,661,930 B2* | 3/2014 | Okada | ................... | B62D 1/184 74/493 |
| 8,746,740 B2* | 6/2014 | Tanaka | .................... | B62D 1/18 280/777 |

(Continued)

FOREIGN PATENT DOCUMENTS

| | | |
|---|---|---|
| DE | 102019105696 A1 | 9/2020 |
| JP | 2014159282 A * | 9/2014 |

(Continued)

OTHER PUBLICATIONS

English translation of Office Action regarding corresponding DE App. No. 10 2020 128 569.8; dated Sep. 3, 2021.

*Primary Examiner* — Laura Freedman
(74) *Attorney, Agent, or Firm* — Dickinson Wright PLLC (57) ABSTRACT

A clamping arrangement for an adjustable assembly includes a lever operatively coupled to the clamping arrangement for moving the assembly between a locked position and an unlocked position, an aperture extending from an inner face of the lever to an outer face of the lever. The clamping arrangement also includes an outer cam having an outer radial surface at least partially disposed within the aperture of the locking lever. The clamping arrangement further includes an inner cam engaged with the outer cam and adjustable assembly. The clamping arrangement yet further includes a rake bolt extending through the lever, the outer cam, the inner cam, and the adjustable assembly.

14 Claims, 13 Drawing Sheets

(56) References Cited

U.S. PATENT DOCUMENTS

| | | | | |
|---|---|---|---|---|
| 8,826,767 B2* | 9/2014 | Maniwa | ............... | B62D 1/184 |
| | | | | 74/492 |
| 8,863,609 B2* | 10/2014 | Tinnin | ............... | B62D 1/185 |
| | | | | 74/493 |
| 8,869,647 B2* | 10/2014 | Hirooka | ............... | B62D 1/184 |
| | | | | 74/493 |
| 8,985,629 B2* | 3/2015 | Hattori | ............... | B62D 1/184 |
| | | | | 280/777 |
| 9,073,573 B2* | 7/2015 | Sugiura | ............... | B62D 1/18 |
| 9,393,986 B1* | 7/2016 | Anspaugh | ............... | B62D 1/184 |
| 9,415,793 B2* | 8/2016 | Kubota | ............... | B62D 1/184 |
| 9,764,757 B2* | 9/2017 | Buzzard | ............... | B62D 1/184 |
| 9,828,017 B2* | 11/2017 | Maniwa | ............... | B62D 1/184 |
| 10,913,483 B2* | 2/2021 | Huber | ............... | B62D 1/195 |
| 2006/0273567 A1* | 12/2006 | Fix | ............... | B62D 1/184 |
| | | | | 280/775 |
| 2014/0109714 A1* | 4/2014 | Bodtker | ............... | B62D 1/184 |
| | | | | 74/493 |
| 2014/0137693 A1* | 5/2014 | Buzzard | ............... | B62D 1/184 |
| | | | | 74/493 |
| 2015/0239490 A1* | 8/2015 | Sakata | ............... | B62D 1/184 |
| | | | | 74/493 |
| 2018/0257693 A1* | 9/2018 | Schnitzer | ............... | B62D 1/184 |
| 2019/0092368 A1 | 3/2019 | Reno et al. | | |

FOREIGN PATENT DOCUMENTS

| | | | |
|---|---|---|---|
| JP | 2015140043 A | * | 8/2015 |
| JP | 2016094950 A | * | 5/2016 |

\* cited by examiner

RAKE LEVER ASSEMBLY

BACKGROUND

The following description relates to a lock for an adjustable steering column, and in particular, a rake lever and/or telescope lock in an adjustable steering column.

Steering columns in vehicles may be adjustable in a rake direction and a telescope direction. The adjustable steering column may be unlocked in order to be adjusted to a desired position. Once the desired position is reached, the steering column may be locked in place to resist movement from the desired position.

A traditional adjustable steering column may include a column jacket, a compression bracket fixed to and movable with the column jacket and a mounting bracket fixed to the vehicle. The column jacket and compression bracket are movable relative to the mounting bracket. The adjustable steering column may further include a locking lever.

The locking lever is rotatable between a locked position where adjustment of the steering column is resisted and an unlocked position where adjustment of the steering column is permitted. The locking lever rotates a lock bolt that extends through the mounting bracket and compression bracket. Rotation of the lock bolt may actuate the rake lock and telescope lock between respective locked and unlocked positions.

In a locked condition, a force may be applied to a plurality of friction plates, which in turn apply a compressive force to at least one of the mounting bracket, compression bracket and column jacket. The force may be applied from a cam mechanism connected to a rotatable locking lever that is configured to apply an axial compressive force in response to rotation of the locking lever in one direction. The compressive force applied to the column jacket acts to hold the adjustable steering column against adjustment.

Typically the practice for a plastic molded locking lever has consisted of overmolding an outer rake cam into the lever assembly. Though functionally proficient there are quality concerns especially when outsourcing fabrication to a molder, ultimately driving up costs.

Accordingly, it is desirable to create a locking lever assembly that does not require overmolding.

SUMMARY

According to one aspect of the disclosure, an adjustable steering column assembly for a motor vehicle includes a clamping arrangement, the steering column assembly adjustable in an unlocked position of the clamping arrangement and in a fixed position in a locked position of the clamping arrangement. The clamping arrangement includes a lever operatively coupled to the clamping arrangement, the lever being rotatable for moving the clamping arrangement between the locked position and the unlocked position. The clamping arrangement also includes an aperture extending from an inner face of the lever to an outer face of the lever. The clamping arrangement further includes an outer cam having an outer radial surface at least partially disposed within the aperture of the lever. The clamping arrangement yet further includes an inner cam engaged with the outer cam and the steering column assembly. The clamping arrangement also includes a rake bolt extending through the lever, the outer cam, the inner cam, and the steering column assembly.

According to another aspect of the disclosure, a clamping arrangement for an adjustable assembly includes a lever operatively coupled to the clamping arrangement for moving the assembly between a locked position and an unlocked position, an aperture extending from an inner face of the lever to an outer face of the lever. The clamping arrangement also includes an outer cam having an outer radial surface at least partially disposed within the aperture of the locking lever. The clamping arrangement further includes an inner cam engaged with the outer cam and adjustable assembly. The clamping arrangement yet further includes a rake bolt extending through the lever, the outer cam, the inner cam, and the adjustable assembly.

According to another aspect of the disclosure, an adjustable steering column assembly. The assembly includes a rotatable lever for moving a clamping arrangement between a locked position and an unlocked position, the rotatable lever defining an aperture extending from an inner face of the lever to an outer face of the lever. The assembly also includes a means for converting the rotation of the lever to an outer cam to a linear motion of an inner cam, the outer cam being at least partially disposed within the aperture of the lever, the outer cam translating the rotation of the lever to a linear motion of the inner cam, the inner cam engaging with the steering column assembly. The assembly further includes a rake bolt for attaching the lever, inner cam, and outer cam to the steering column assembly, creating a clamping pressure between the inner cam and an end of a bolt shank, the rake bolt extending through the lever, the outer cam, the inner cam, and the steering column assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
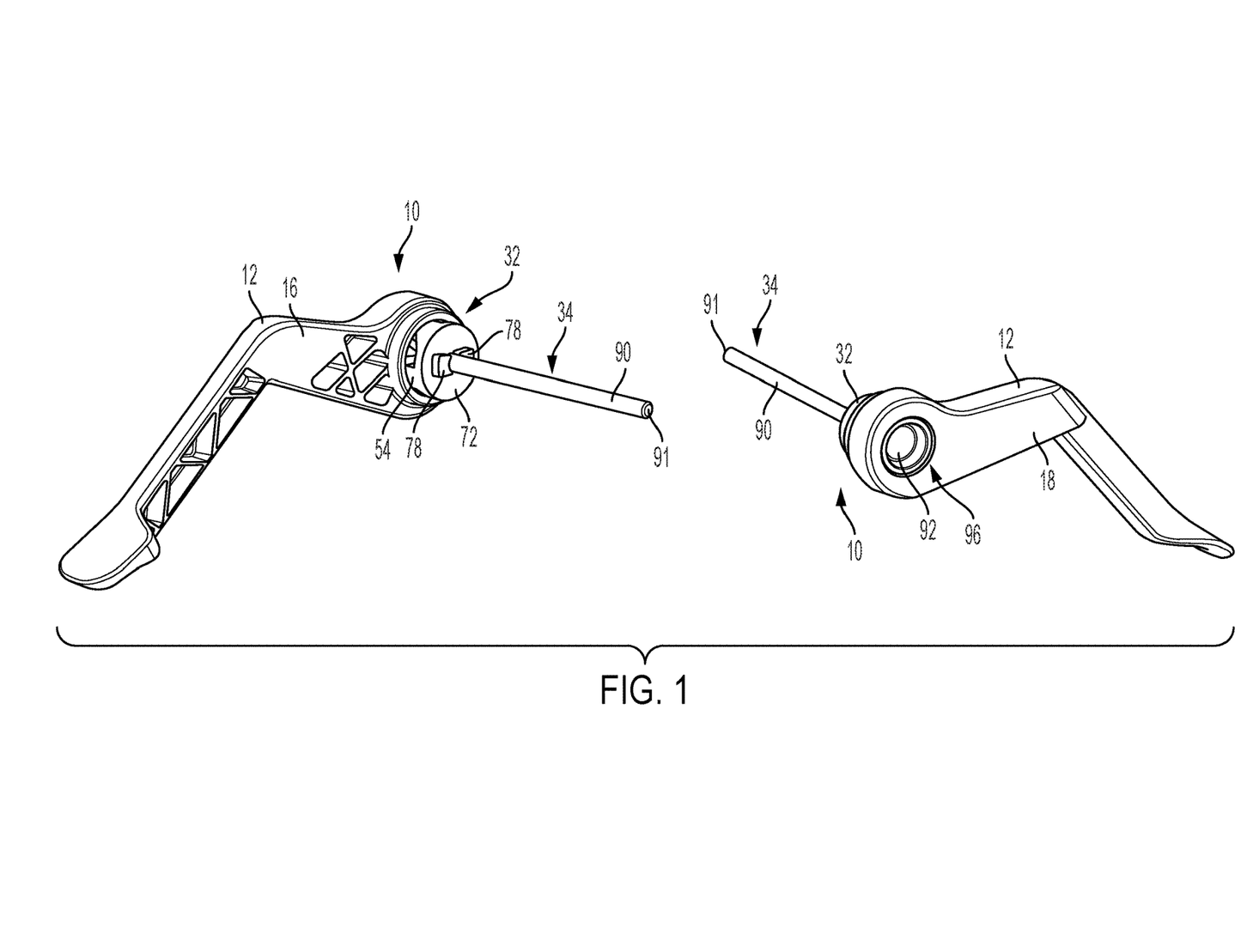
FIG. 1 is a perspective view of a clamping arrangement for an adjustable steering column assembly.
Figure 2:
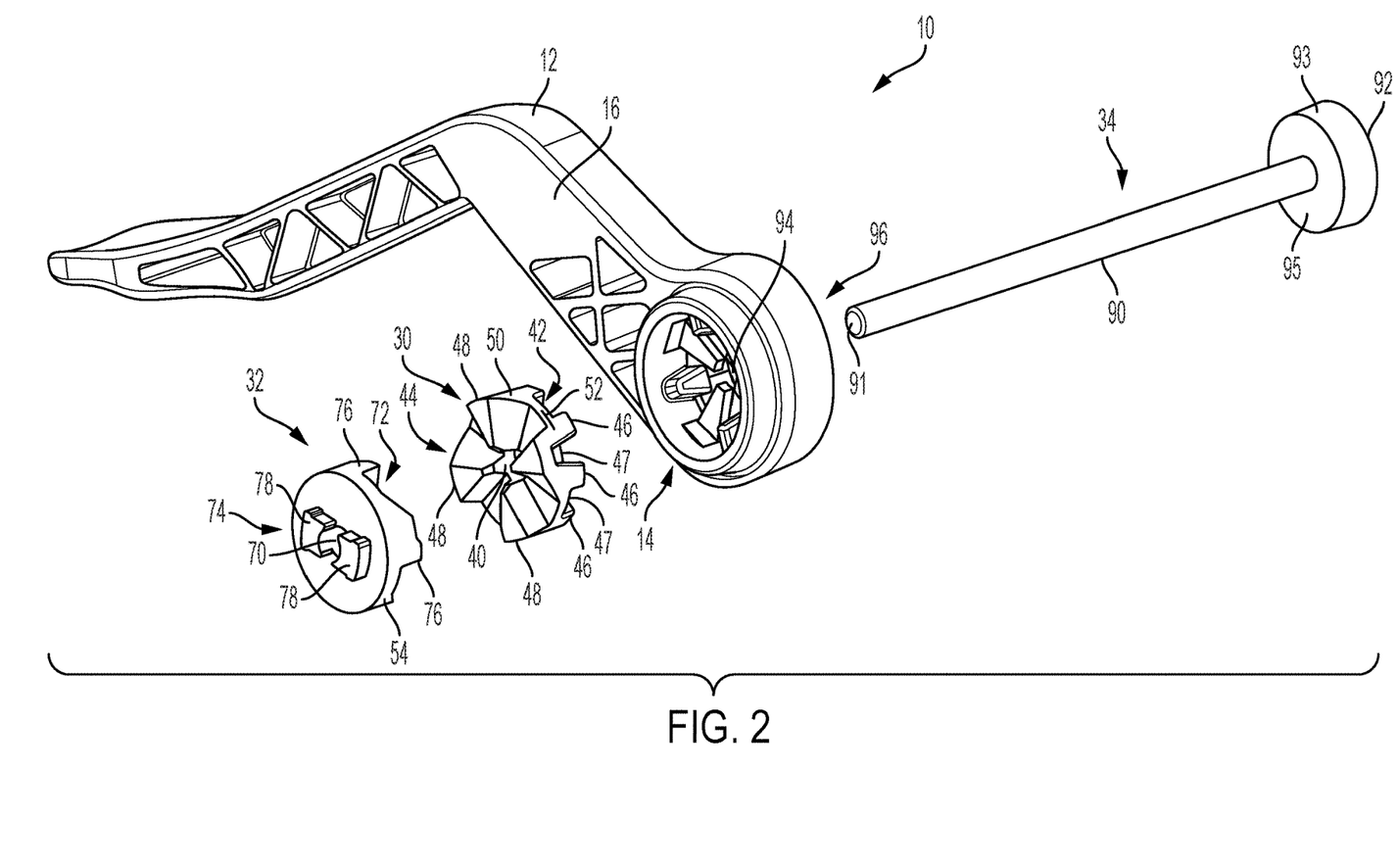
FIG. 2 is a disassembled view of the clamping arrangement.

Referring to FIGS. 1 and 2, a clamping arrangement 10 for a vehicle adjustable steering column assembly is shown. A rotatable lever 12 is configured to actuate the clamping arrangement 10 between a locked position and an unlocked position. The rotatable lever 12 is an extension of the clamping arrangement 10 into a cabin (not shown) of the motor vehicle, the lever 12 being accessible to a driver (not shown). The driver may engage the lever 12 in order to transition the steering column assembly from a locked position to an unlocked position or vice versa. In an unlocked position the position of the steering column is adjustable and, when rotated into a locked position, the position of the steering column is fixed. The rotatable lever 12 defines an aperture 14 which extends from an inner face 16 of the lever 12 to an outer face 18 of the lever 12. The clamping arrangement 10 also includes an outer cam 30 that may be partially or fully disposed within the aperture 14 of the lever 12, an inner cam 32 operatively engaged with the outer cam 30, and a rake bolt 34. The rake bolt 34 extends through the lever 12, the outer cam 30, and the inner cam 32. The outer cam is an instrument for converting rotation of the lever 12 to a linear force provided by the inner cam 32 to clamp the steering column assembly. The rake bolt 34 extends through the entire clamping arrangement 10 and the steering column assembly so as to hold both assemblies in place in relation to one another.

The outer cam 30 has a central opening 40 which extends through an outer face 42 of the outer cam 30 and an inner face 44 of the outer cam 30. The outer face 42 of the outer cam 30 has at least one member 46 arranged to engage with the lever 12. In some embodiments there may be two sets of members 46 which form a wedge 47 (FIGS. 2 and 9) to matingly engage the lever 12. The inner face 44 of the outer cam 30 has at least one member 48 arranged to engage the inner cam 32. The outer cam 30 of the clamping arrangement 10 also has an outer radial surface 50 which in some embodiments has a set of flat portions 52 which align the outer cam 30 with the lever 12 in a desirable orientation. In some embodiments the outer radial surface 50 of the outer cam 30 is fully disposed within the aperture 14 of the lever 12 during operation.

The inner cam 32 has a central opening 70 which extends through an outer face 72 of the inner cam 32 and an inner face 74 of the inner cam 32. The inner cam also has an outer radial surface 54. The outer face 72 of the inner cam 32 has at least one member 76 arranged to engage the member 48 of the inner face 44 of the outer cam 30. The inner face 74 of the inner cam 32 has at least one member 78 arranged to engage with the steering column assembly to create a clamping pressure.

The rake bolt 34 includes a bolt shank 90 with an end point 91, and a bolt head 92. The bolt head 92 has an outer diameter 93 which could be circular or square in shape and a first side 95 which faces inward into the lever 12. The outer diameter 93 is used to hold the rake bolt 34 in place relative to the lever 12 which, in some embodiments, allows the rake bolt 34 to rotate with the lever 12 in operation. The bolt shank 90 passes through a pilot hole 94 of the lever 12, the opening 40 of the outer cam 30, the opening 70 of the inner cam 32, and out the opposite side of the steering column assembly, ending at the end point 91. The bolt head 92 is received within a receiving chamber 96 of aperture 14 on the outer face 18 of the lever 12 (FIG. 1). The receiving chamber 96 acts as a bearing for the outer diameter 93 of the rake bolt head 92. The rake bolt 34 is fastened with an adjustment nut (not shown) on the end point 91 of the bolt shank 90, creating a clamping pressure when the inner cam 32 is engaged with the steering column assembly.

Referring to FIGS. 3-6, the pilot hole 94 of the lever 12 extends through the inner face 16 and outer face 18 of lever 12. The inner face 16 of lever 12 has a set of driving teeth 100 and an inner wall 102. In some embodiments the inner wall 102 of the aperture 14 has a set of flat portions 104. The flat portions 104 prevent incorrect alignment of the outer cam 30 by aligning with the flat portions 52 of the outer radial surface 50 of the outer cam 30 when the outer cam 30 is inserted into the lever aperture 14.

Figure 11:
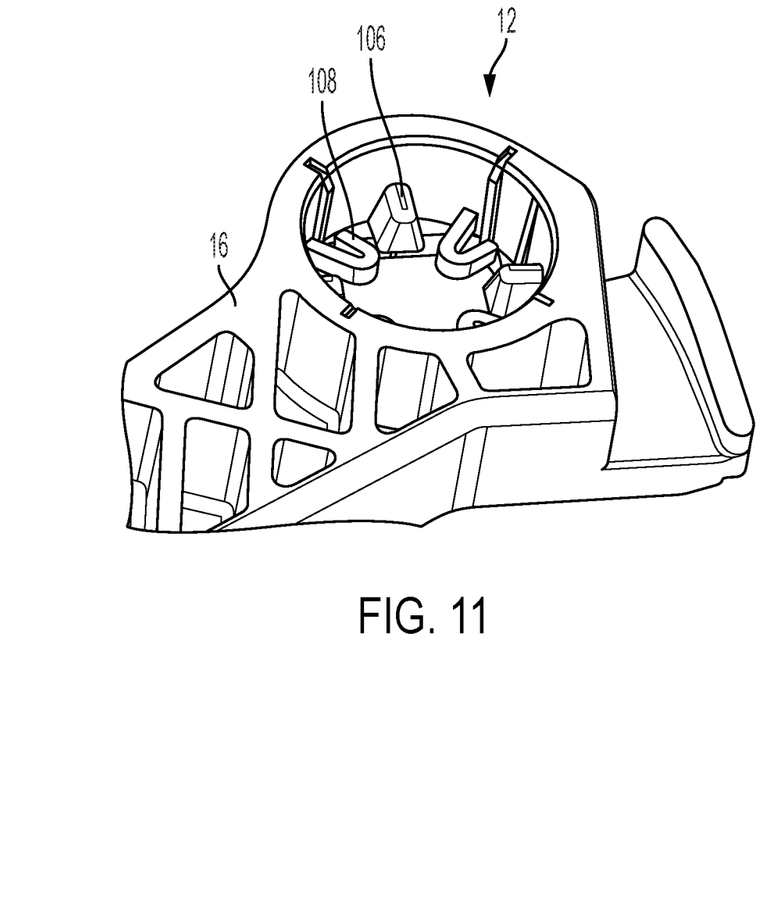
FIG. 11 is a perspective view of an inner face of the lever according to another aspect of the disclosure.
Figure 12:
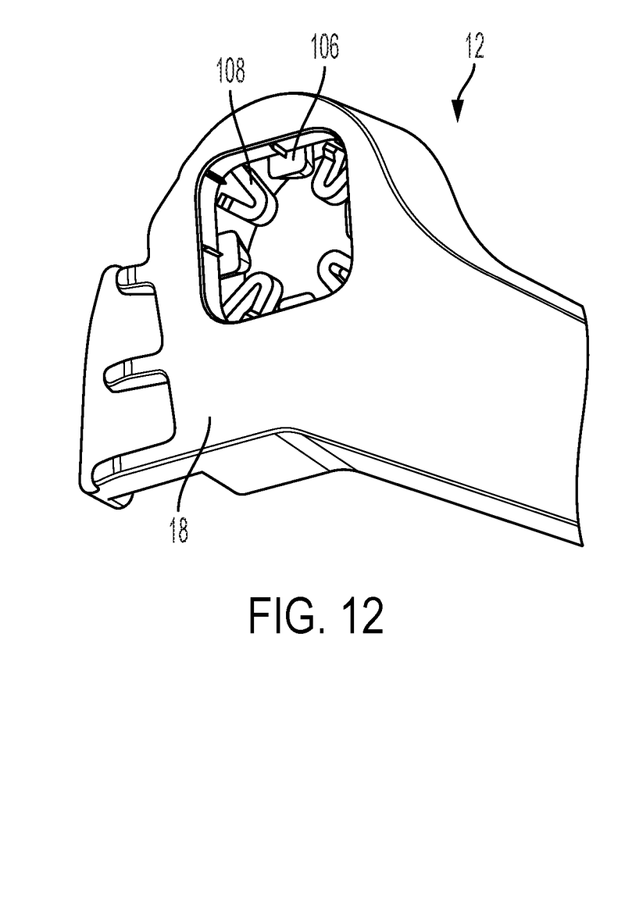
FIG. 12 is a perspective view of an outer face of the lever of FIG. 11.
Figure 13:
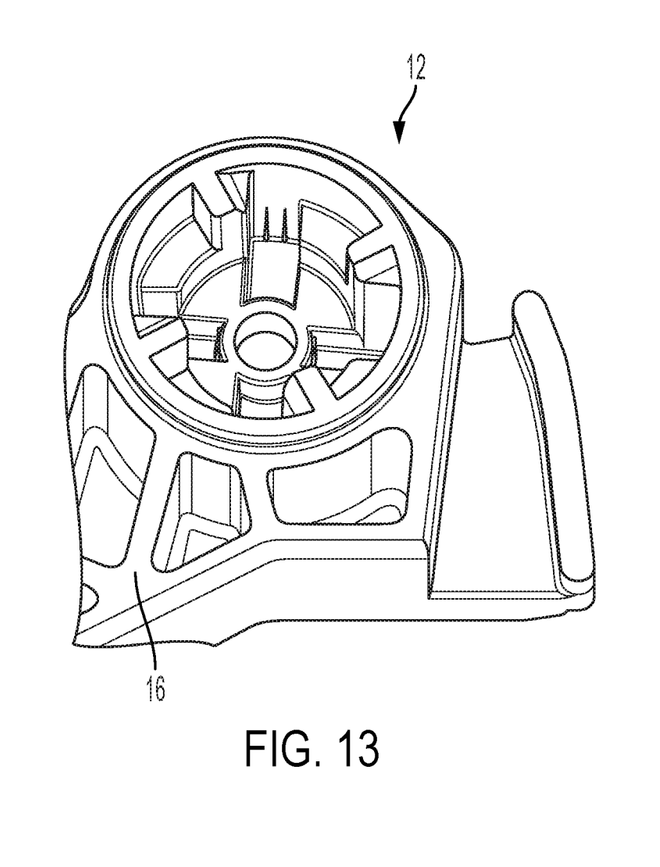
FIG. 13 a perspective view of an inner face of the lever according to another aspect of the disclosure.
Figure 14:
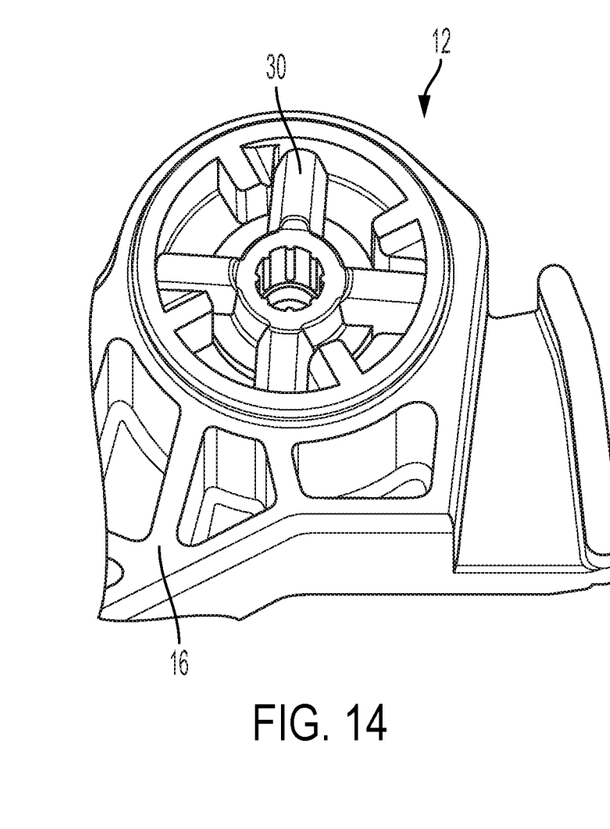
FIG. 14 is a perspective view of an inner face of the lever of FIG. 13 with a cam inserted therein.
Figure 15:
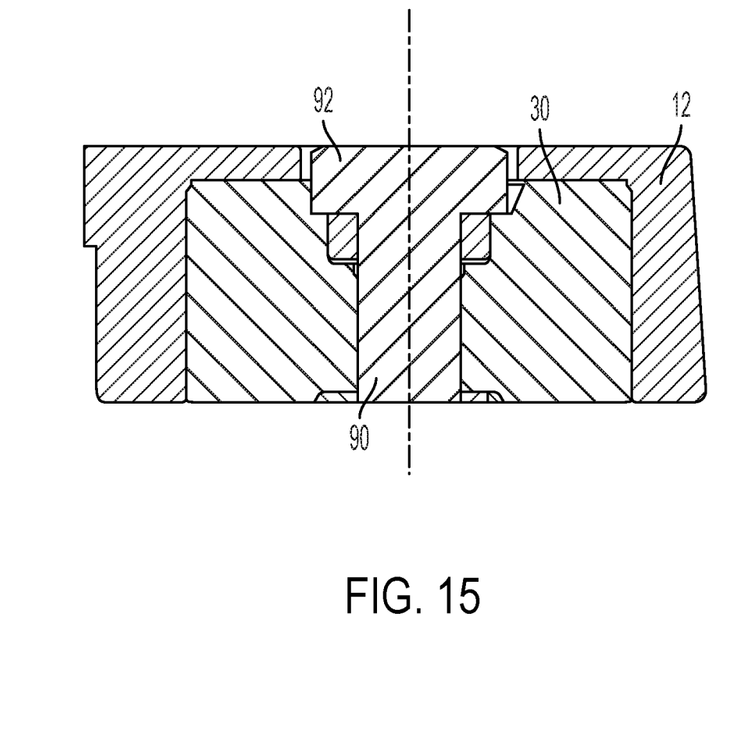
FIG. 15 is a cross-sectional view of the embodiments of FIGS. 13 and 14.
Figure 16:
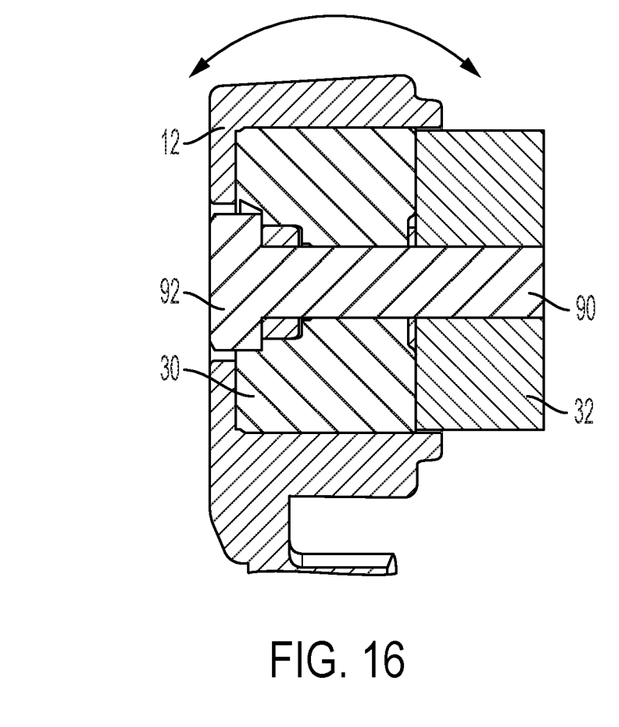
FIG. 16 is another cross-sectional view of the embodiments of FIGS. 13 and 14.

The driving teeth 100 include a primary set of primary driving teeth 106 and a secondary set of driving teeth 108. The primary set of driving teeth 106 project on a first side 110 and are flat on a second side 112 (See FIG. 4). The primary set of driving teeth 106 matingly engage with the wedge 47 of the outer cam 30 on the first side 110. The secondary set of driving teeth 108 have a first side that is flat and a second side that is flat, with a protruding contact point 113. The contact point 113 may be a circular protrusion referred to herein as a contact button 114 (see FIG. 4) or an angular protrusion 116 (see FIG. 6). The purpose of the contact point 113 is to contact the first side 95 of the bolt head 92. This contact allows the secondary set of driving teeth 108 to act as a resilient feature to seat the bolt head 92. In some embodiments, the second teeth 108 are flexible fingers (FIGS. 11 and 12) to apply the reacted load further away from the bolt shank 90 centerline. This enhances the overturning stiffness of the system without increasing stress.

Figure 4:
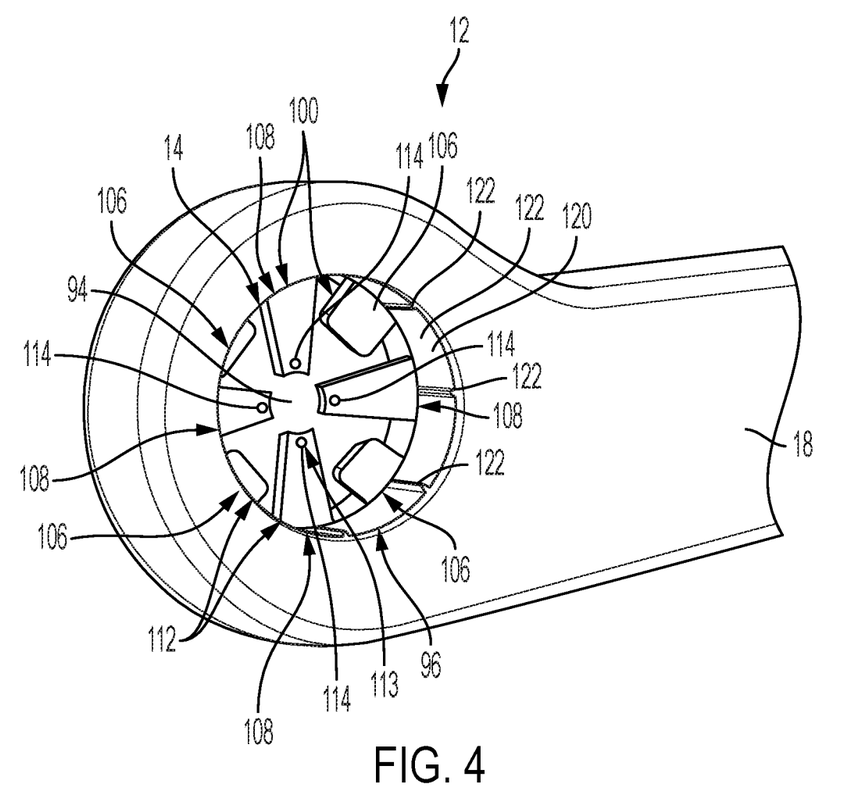
FIG. 4 is a perspective view of an outer face of the lever of the clamping arrangement.
Figure 5:
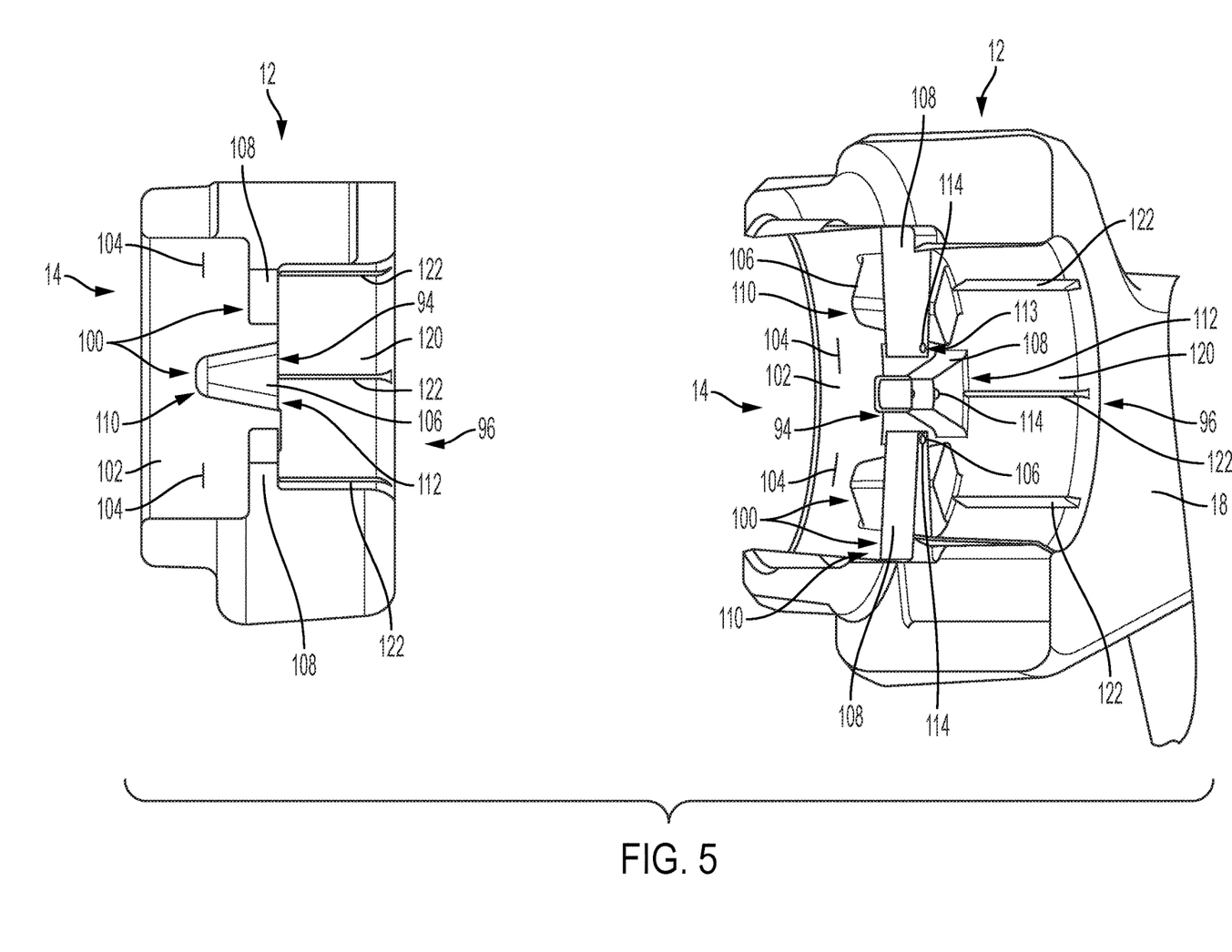
FIG. 5 is a partial cross sectional view of the lever of the clamping arrangement.
Figure 6:
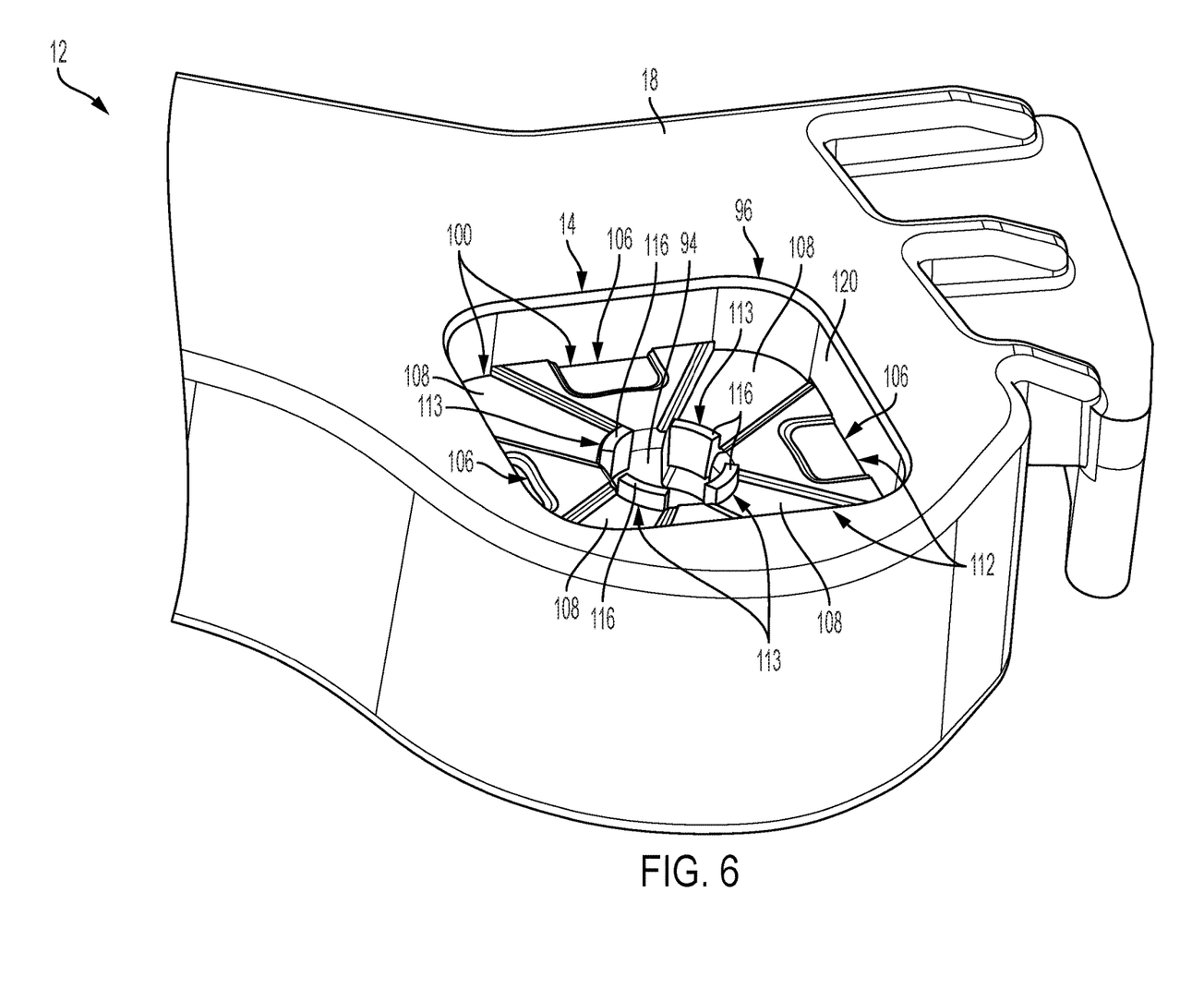
FIG. 6 is a perspective view of an outer face of the lever of the clamping arrangement.

The receiving chamber 96 of the aperture 14 has an inner wall 120 which may be lined with a set of thin linear protrusions, referred to herein as a set of crush ribs 122 (see FIGS. 4 and 5). The crush ribs 122 help secure an outer diameter 93 of the bolt head 92 in place as it relates to the lever 12.

Figure 7:
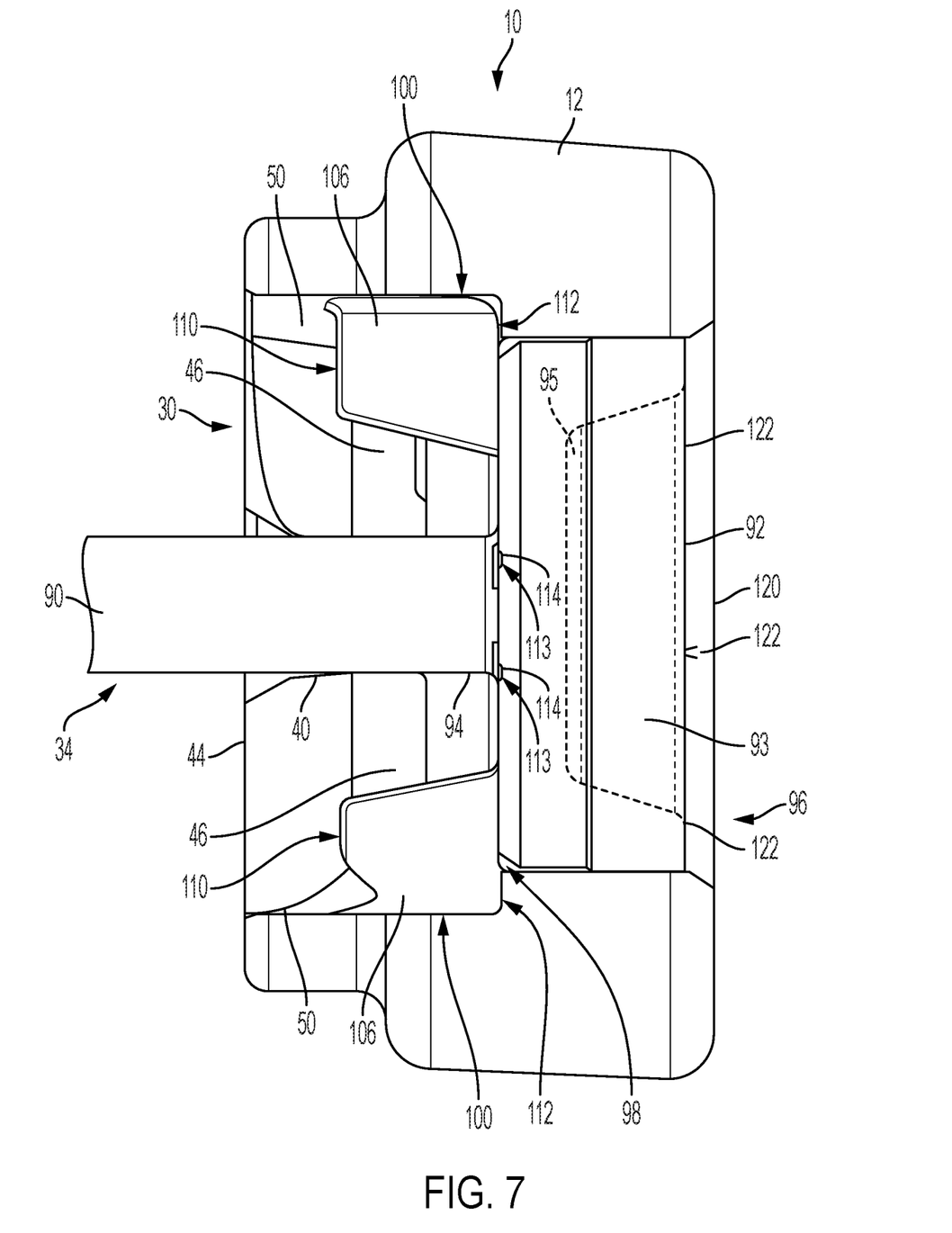
FIG. 7 is a partial cross-sectional view of the lever of the clamping arrangement.

Referring to FIG. 7, a partial cross-sectional view of the lever 12 is shown with the rake bolt 34 inserted into the lever 12. The rake bolt shank 90 is shown passing through the pilot hole 94 of the lever 12 and the central opening 40 of the outer cam 30. The bolt head 92 is fully inserted into the receiving chamber 96 of the lever 12 and the outer cam 30 is fully inserted into the lever aperture 14 on the inner face 16 of the lever 12. A gap is maintained between the underside of the secondary drive teeth 108 to the outer cam 30 while bolt head 92 bottoms out, i.e. makes contact, on the outer cam 30. The contact point 113 is simultaneously in contact with the bolt head 92.

Figure 3:
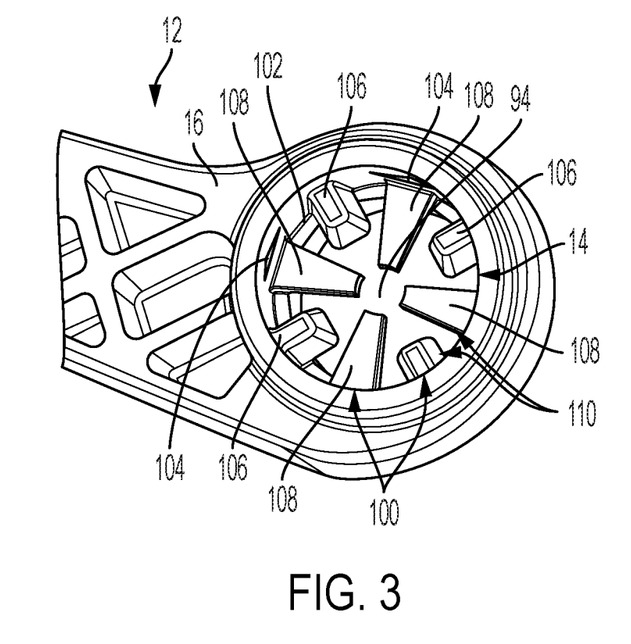
FIG. 3 is a perspective view of an inner face of a lever of the clamping arrangement.
Figure 8:
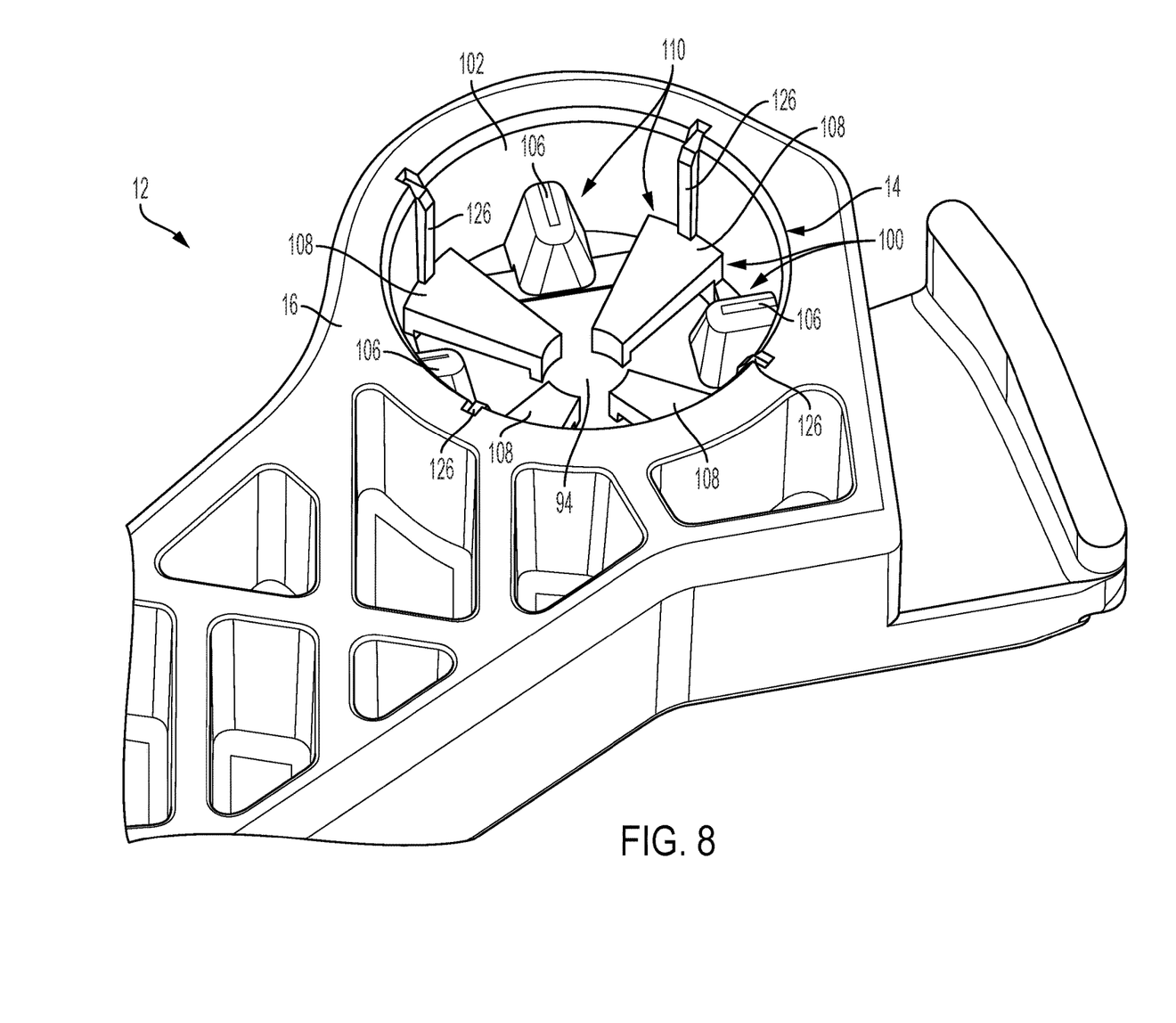
FIG. 8 is a perspective view of an inner face of a lever of the clamping arrangement.
Figure 9:
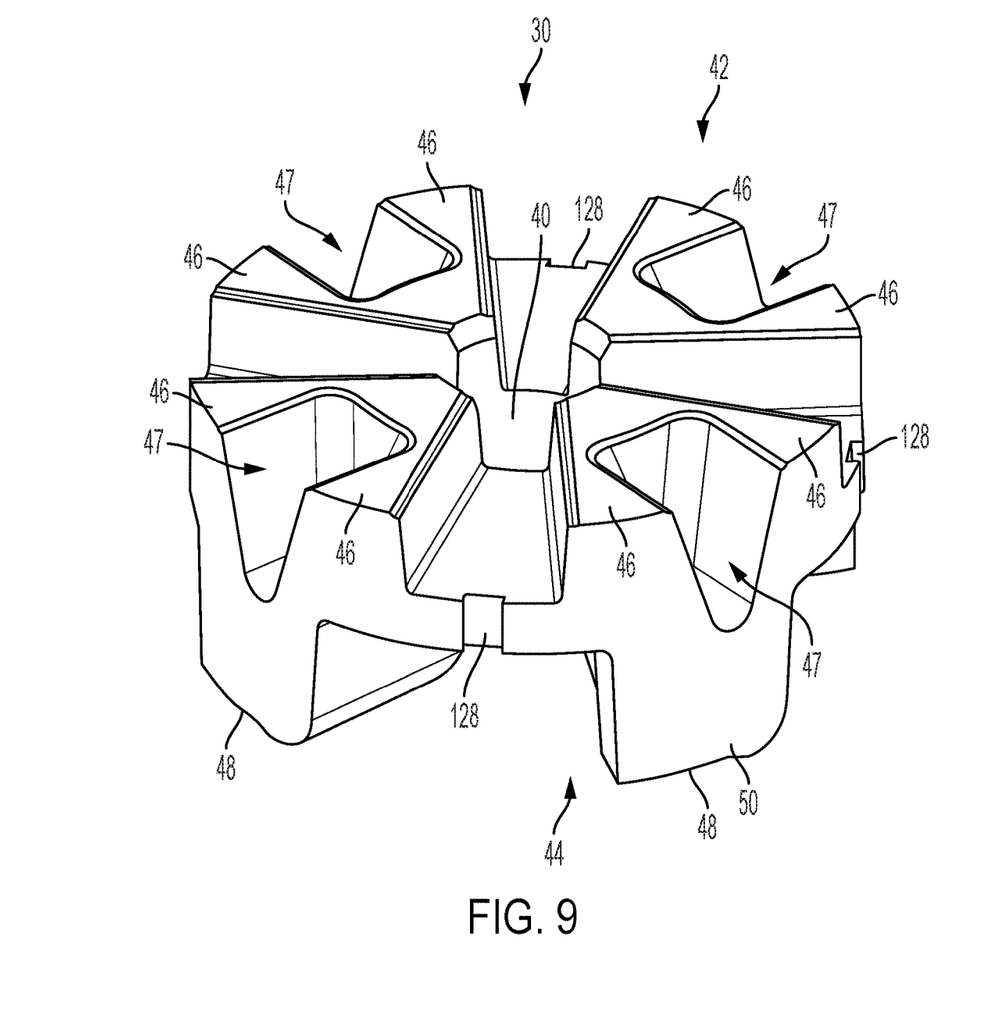
FIG. 9 is a perspective view of an outer cam with an alignment slot.
Figure 10:
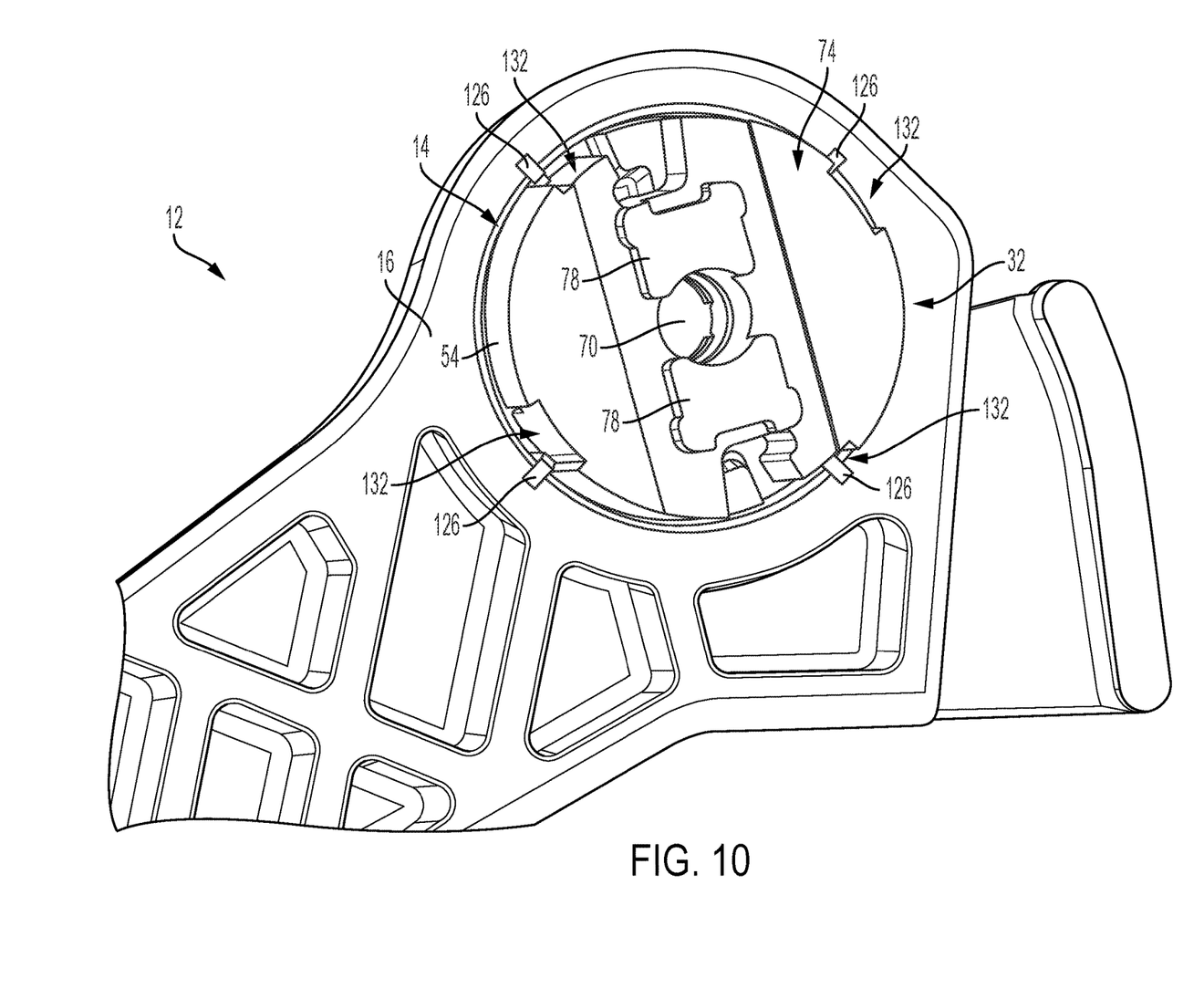
FIG. 10 is a perspective view of an inner face of the lever and an inner face of an inner cam of the clamping arrangement.

Referring to FIGS. 8-10, an embodiment is shown, with the inner wall 102 of the aperture 14 having a set of linear alignment features 126 rather than flat portions 104 (see FIG. 3). The alignment feature 126 (see FIG. 8) prevents incorrect alignment of the outer cam 30 by aligning with an alignment slot 128 (see FIG. 9) of the outer radial surface 50 of the outer cam 30 when the outer cam 30 is inserted into the lever aperture 14. In this embodiment the outer radial surface 54 of the inner cam 32 has a set of notches 132 to allow for clearance in relation to the alignment feature 126 (see FIG. 10).

Referring to FIGS. 13-16, another embodiment of the clamping arrangement 10 is shown. In the illustrated embodiment, the outer cam 30 is press fit to the lever 12, in contrast to a loose fit that was delashed when the rake lever was locked, as described in other embodiments disclosed herein. When sample hardware was made, the lateral looseness of the lever in the unlocked condition was greater than calculated. Added interference fits to certain interfaces are provided for the following: 1) bolt shank diameter to outer cam 30 inside diameter; 2) outer cam 30 outside diameter to lever 12 inside diameter; and 3) outer cam 30 drive teeth flanks to lever drive teeth flanks. The embodiment of FIGS. 13-16 may be referred to herein as a ring and spoke configuration. Such a configuration fulfills the function of the axial resilience provided by the secondary drive teeth 108 described herein in detail.

In operation, the driver engages the lever 12 of the clamping arrangement 10 with a force causing the lever 12 to rotate. The rotation of the lever 12 is then transferred to the outer cam 30 through the driving teeth 100 of the lever 12 which are in contact with the member 46 of the outer face 42 of the outer cam 30. Rotation of the lever 12 is also transferred through contact between the inner wall 102 of the aperture 14 on the inner face 16 of the lever 12 and the outer radial surface 50 of the outer cam 30. The diametral contact provides additional overturning stiffness of the lever 12. The outer cam 30 rotates relative to the inner cam 32. Contact is maintained between the cams 30, 32 by a resilient force of the steering column assembly and contained by the adjuster nut. The cam surfaces—specifically member 48 of the inner face 44 of the outer cam 30 and member 76 of the outer face 72 of the inner cam 32—convert the relative rotary motion to a simultaneous relative linear motion, thereby causing the outer cam 30, the lever 12, and the rake bolt 34 to shuttle outwardly away from the inner cam 32 and the steering column assembly. This creates a clamping pressure between the inner cam 32 and the end point 91 of the bolt shank 90. In some embodiments, rotation of the lever 12 may be transferred to a plurality of cam surfaces before being transferred to the linear motion of the inner cam 32. The rotation of the lever 12 causes the clamping arrangement 10 to then transition from the locked position to the unlocked position or from the unlocked position to the locked position.

Advantageously, the embodiments described herein eliminate the need for overmolding an outer cam 30 into the lever 12. Though functionally proficient there are quality concerns especially when outsourcing fabrication to a molder which ultimately drives up costs. The molding supplier also charges more when overmolding a supplied part. With the above embodiments the molder can simply make the lever 12 while fabrication and assembly of all other parts, such as the outer cam 30, can remain entirely in house. This both lowers costs and eliminates some quality concerns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column assembly for a motor vehicle comprising a clamping arrangement, the steering column assembly adjustable in an unlocked position of the clamping arrangement and fixed in a locked position of the clamping arrangement, the clamping arrangement comprising:

a lever operatively coupled to the clamping arrangement, the lever being rotatable for moving the clamping arrangement between the locked position and the unlocked position;

an aperture extending from an inner face of the lever to an outer face of the lever;

an outer cam having an outer radial surface at least partially disposed within the aperture of the lever;

an inner cam engaged with the outer cam and the steering column assembly; and a rake bolt extending through the lever, the outer cam, the inner cam, and the steering column assembly, the lever having a pilot hole, the pilot hole extending through the inner face of the lever and the outer face of the lever, the outer face of the lever having a receiving chamber, the outer surface of the outer cam having alignment slots which align with alignment features of an inner wall of the receiving chamber of the lever and with a set of notches on an outer radial surface of the inner cam.

2. The adjustable steering column assembly of claim 1, the receiving chamber of the outer face of the lever having an inner wall lined with crush ribs.

3. The adjustable steering column assembly of claim 1, the outer radial surface of the outer cam having flat portions which align with a set of flat portions of an inner wall of the receiving chamber of the lever.

4. The adjustable steering column assembly of claim 1, the outer cam of the clamping arrangement having a central opening extending through an inner face of the outer cam and an outer face of the outer cam.

5. An adjustable steering column assembly for a motor vehicle comprising a clamping arrangement, the steering column assembly adjustable in an unlocked position of the clamping arrangement and fixed in a locked position of the clamping arrangement, the clamping arrangement comprising:

a lever operatively coupled to the clamping arrangement, the lever being rotatable for moving the clamping arrangement between the locked position and the unlocked position;

an aperture extending from an inner face of the lever to an outer face of the lever;

an outer cam having an outer radial surface at least partially disposed within the aperture of the lever;

an inner cam engaged with the outer cam and the steering column assembly; and a rake bolt extending through the lever, the outer cam, the inner cam, and the steering column assembly, the inner face of the lever having driving teeth, the driving teeth being comprised of a primary set of driving teeth and a secondary set of driving teeth, the primary set of driving teeth projecting out on a first side and being flat on a second side, the secondary set of driving teeth having a first side that is flat and a second side that is flat with a contact point.

6. The adjustable steering column assembly of claim 5, the outer face of the outer cam having at least one member arranged to engage with the first side of the driving teeth of the lever, and the inner face of the outer cam having at least one member arranged to engage the inner cam.

7. The adjustable steering column assembly of the claim 6, the inner cam having an opening extending through an inner face of the inner cam and an outer face of the inner cam, the outer face of the inner cam having at least one member arranged to the engage the at least one member of the inner face of the outer cam, and the inner face of the inner cam having at least one member arranged to engage the steering column assembly.

8. The adjustable steering column assembly of claim 7, the rake bolt having a bolt head, a bolt shank and a bolt end point, the bolt shank passing through a pilot hole of the lever, a central opening of the outer cam, the opening of the inner cam, and an opposite side of the steering column assembly at the bolt end point, the bolt head being received within a receiving chamber of the outer face of the lever.

9. The adjustable steering column assembly of claim 8, wherein the outer cam is press fit within an aperture of the lever.

10. The adjustable steering column assembly of claim 8, wherein the bolt shank is press fit within a central opening of the outer cam.

11. A clamping arrangement for an adjustable assembly comprising:
a lever operatively coupled to the clamping arrangement for moving the assembly between a locked position and an unlocked position, an aperture extending from an inner face of the lever to an outer face of the lever;
an outer cam having an outer radial surface at least partially disposed within the aperture of the lever;
an inner cam engaged with the outer cam and adjustable assembly; and
a rake bolt extending through the lever, the outer cam, the inner cam, and the adjustable assembly, the inner face of the lever having driving teeth, the driving teeth comprising a primary set of driving teeth and a secondary set of driving teeth, the primary set of driving teeth projecting out on a first side and being flat on a second side, the secondary set of driving teeth having a first side that is flat and a second side that is flat with a protruding contact point.

12. The clamping arrangement for the adjustable assembly of claim 11, the outer face of the lever having a receiving chamber, the receiving chamber having an inner wall lined with crush ribs and flat portions.

13. The clamping arrangement for the adjustable assembly of claim 12, the flat portions of the inner wall of the receiving chamber aligning with a set of flat portions on the outer radial surface of the outer cam.

14. The clamping arrangement for the adjustable assembly of claim 11, the outer cam of the clamping arrangement having a central opening extending through an inner face of the outer cam and an outer face of the outer cam, wherein an outer surface of the outer cam having flat portions which align with flat portions of an inner wall of a receiving chamber of the lever, the outer face of the outer cam having at least one member arranged to engage with a first side of the driving teeth of the lever, and the inner face of the outer cam having at least one member arranged to engage the inner cam.

* * * * *